United States Patent
Scharnbacher et al.

(10) Patent No.: US 11,449,688 B2
(45) Date of Patent: Sep. 20, 2022

(54) PROCESSING OF TRANSLATION-RESISTANT CONTENT IN WEB APPLICATION

(71) Applicant: SAP SE, Walldor (DE)

(72) Inventors: Jens Scharnbacher, Walldorf (DE); Michail Vasiltschenko, Schriesheim (DE)

(73) Assignee: SAP SE, Walldorf (DE)

( * ) Notice: Subject to any disclaimer, the term of this patent is extended or adjusted under 35 U.S.C. 154(b) by 271 days.

(21) Appl. No.: 16/818,760

(22) Filed: Mar. 13, 2020

(65) Prior Publication Data

US 2021/0286955 A1   Sep. 16, 2021

(51) Int. Cl.
*G06F 40/58* (2020.01)
*G06F 16/332* (2019.01)
*G06F 40/186* (2020.01)
*G06F 40/51* (2020.01)

(52) U.S. Cl.
CPC .......... *G06F 40/58* (2020.01); *G06F 16/3325* (2019.01); *G06F 40/186* (2020.01); *G06F 40/51* (2020.01)

(58) Field of Classification Search
CPC .......... G06F 40/40–58; G06F 16/3325; G06F 40/186; G06F 9/454
See application file for complete search history.

(56) References Cited

U.S. PATENT DOCUMENTS

| | | |
|---|---|---|
| 5,270,928 A | 12/1993 | Suzuki et al. |
| 5,715,466 A | 2/1998 | Flanagan et al. |
| 7,318,020 B1 * | 1/2008 | Kim .................. G06F 40/58 704/4 |
| 7,383,387 B2 | 6/2008 | Yankovsky |
| 8,126,702 B2 | 2/2012 | Lang et al. |
| 8,150,676 B1 * | 4/2012 | Kaeser ............... G06F 40/56 715/260 |

(Continued)

OTHER PUBLICATIONS

Dan Kehn, et al. "How to Internationalize Your Eclipse Plug-In" IBM Eclipse ISV Enablement Team, 2002, 20 pages.

(Continued)

*Primary Examiner* — Jesse S Pullias
(74) *Attorney, Agent, or Firm* — Fountainhead Law Group P.C.

(57) ABSTRACT

An engine interposed between an application translator and UI intercepts string templates populated with string variables and output by the translator. The engine determines translation-resistance of the string template. Such determination can be based upon an existing mark inserted by the translator, a number of string variables in the string template, a comment in the string template, user settings, or syntax rules. Frequently, translation-resistance of the string template is not indicated and the engine simply forwards on the string template to the user. Less frequently, the engine determines the string template to be resistant to translation. Then, the engine causes the string template to be processed according to a prefix and a suffix inserted thereto. The processing can comprise forwarding the string template for machine translation, and/or falling back to a simpler string variant. The modified content resulting from the processing is communicated by the engine to the user.

17 Claims, 5 Drawing Sheets

(56) References Cited

U.S. PATENT DOCUMENTS

| | | | |
|---|---|---|---|
| 9,170,826 B2 | 10/2015 | Brunswig et al. | |
| 9,201,870 B2 | 12/2015 | Jurach, Jr. et al. | |
| 9,411,793 B2 | 8/2016 | Travieso et al. | |
| 2003/0154068 A1* | 8/2003 | Tokuda | G06F 40/47 |
| | | | 704/7 |
| 2006/0100853 A1* | 5/2006 | McEntee | G06F 9/454 |
| | | | 704/9 |
| 2015/0154184 A1* | 6/2015 | Bahgat | G06F 40/55 |
| | | | 704/2 |
| 2018/0322117 A1* | 11/2018 | Cohen | G06F 40/58 |
| 2019/0294684 A1 | 9/2019 | Joo et al. | |

OTHER PUBLICATIONS

Balazs Benedek "Website Localization With Translation Proxy", Globalization and Localization Association, Dec. 2019, 9 pages.

Anonymous "Website Translation Solution For Any business Vertical", Jan. 22, 2020, 3 pages.

Anonymous "Django Translation" https://docs.djangoproject.com/en/2.2/topics/i18n/translation, dated 2020, 29 pages.

\* cited by examiner

PROCESSING OF TRANSLATION-RESISTANT CONTENT IN WEB APPLICATION

BACKGROUND

Unless otherwise indicated herein, the approaches described in this section are not prior art to the claims in this application and are not admitted to be prior art by inclusion in this section.

Subtle differences between different human languages can create challenges in providing text within user interfaces (UIs) of computer applications. For example, a developer may employ text templating as part of a UI design. According to such text templating, a developer may create a sentence pattern and seek to fill it with translated text variables.

Some text variables, however, are difficult to translate. In particular, text variables can represent various types of different content, some of which is highly specific to a particular domain. The particular strings describing that content may make sense in the English language, but may not make sense in the context of other human languages (e.g., those utilizing cases, genders, plural forms, etc.)

SUMMARY

An engine interposed between an application translator and UI, intercepts string templates populated with string variables and output by the translator. The engine determines translation-resistance of the string template. Such determination can be based upon an existing mark inserted by the translator, a number of string variables in the string template, a comment in the string template, user settings, syntax rules, or other considerations.

Frequently, translation-resistance of the populated string template is not indicated. Then, the engine simply forwards the string template on to the user.

Less frequently, the engine determines the populated string template to be resistant to translation. Then, the engine causes the string template to be processed according to a prefix and a suffix inserted thereto.

The processing can comprise forwarding the string template for machine translation, and/or falling back to a simpler string variant. The modified content resulting from the processing is communicated by the engine to the user for review.

The following detailed description and accompanying drawings provide a better understanding of the nature and advantages of various embodiments.

DETAILED DESCRIPTION

Described herein are methods and apparatuses that process strings in dynamic web application UIs. In the following description, for purposes of explanation, numerous examples and specific details are set forth in order to provide a thorough understanding of embodiments according to the present invention. It will be evident, however, to one skilled in the art that embodiments as defined by the claims may include some or all of the features in these examples alone or in combination with other features described below, and may further include modifications and equivalents of the features and concepts described herein.

Embodiments comprise an engine interposed between an application translator and a user interface. The UI intercepts string templates populated with string variables and output by the translator. The engine determines translation-resistance of the string template. Such determination can be based upon an existing mark inserted by the translator, a number of string variables in the string template, a comment in the string template, user settings, syntax rules, or other considerations. Frequently, translation-resistance of the string template is not indicated. Then, the engine simply forwards the string template on to the user.

Less frequently, the engine determines the string template to be resistant to translation according to one or more of the above factors. Then, the engine causes the string template to be processed according to a prefix and a suffix inserted thereto. The processing can comprise forwarding the string template for machine translation, and/or falling back to a simpler string variant. The modified content (e.g., machine translated, simplified string variant) resulting from the processing is then communicated from the engine to the user.

Figure 1:
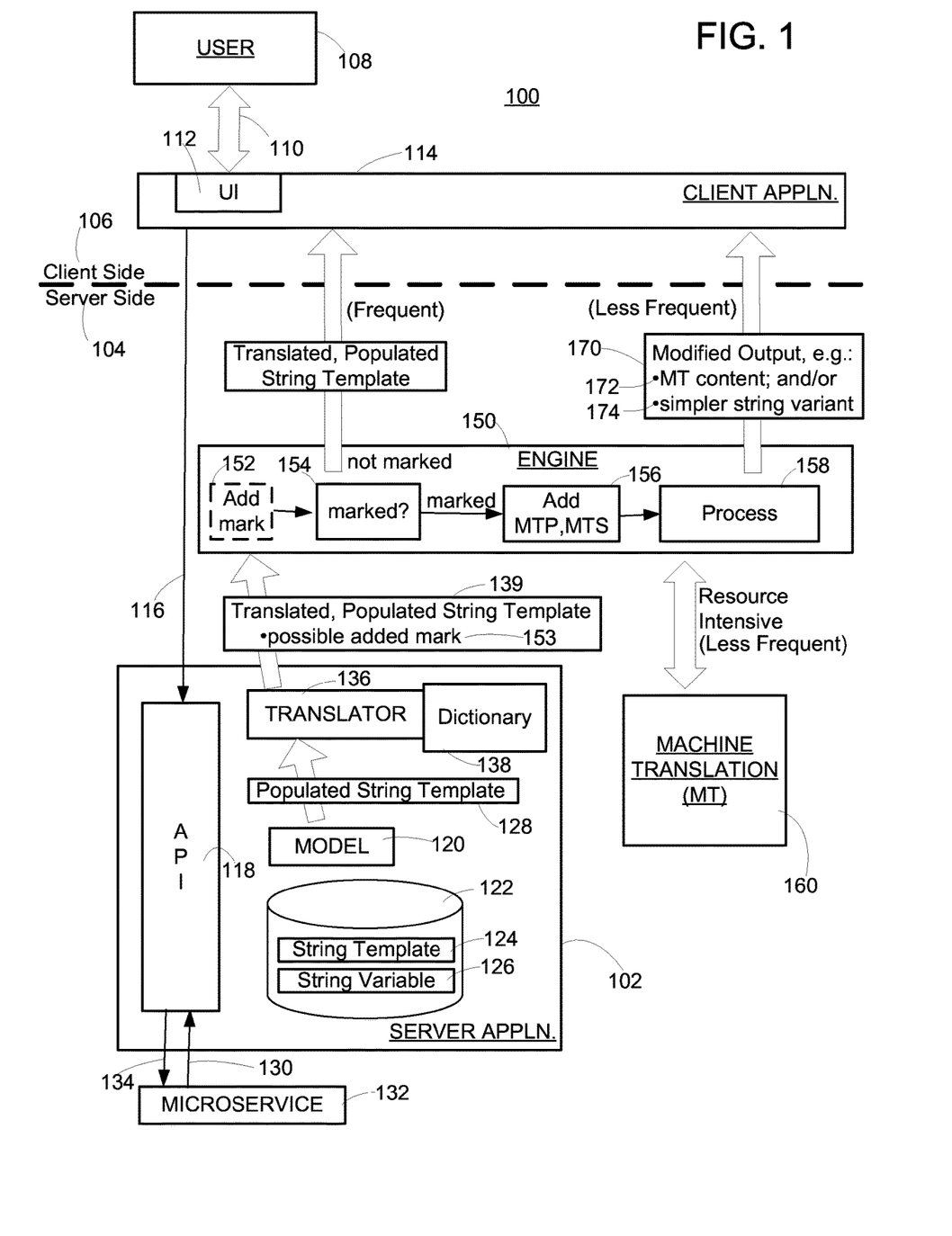
FIG. 1 shows a simplified diagram of a system according to an embodiment.

FIG. 1 shows a simplified view of an example system that is configured to provide string translation according to an embodiment. Specifically, system 100 comprises an application 102 running on a server side 104 remote from a client side 106.

A user 108 of the application interacts 110 with a user interface 112 of a client side portion 114 of the application. That client side UI may be configured to recognize a particular language other than English (e.g., Spanish).

In response to interaction by the user, the client side application provides an input 116 to the Application Program interface (API) 118 of the application 102. The application then processes the input to provide a corresponding output.

In particular, the application comprises a model 120 describing the behavior of a complex entity (e.g., corporation). The application also comprises a database 122 that includes string templates 124 and string variables 126.

Based upon the input received, the application may reference the model to generate an output 128 in the form of a string template populated with string variable(s). It is noted that the received input 116 may come directly from the UI.

Alternatively, however, the input 130 may come from a microservice 132 to which the application has sent a request 134. One example of such a microservice could be a conversion between national currencies, where the application is tasked with generating an output relating to a monetary value (e.g., a profit).

The application further includes a translator 136. The translator functions to translate the populated string template, into a target language. In one possible example, a developer may have conceived of and expressed concepts of the model (e.g., dimensions, measures) in English terms, but the user is awaiting the output of the application to be expressed by the UI in a different language (e.g., Spanish).

Accordingly the translator includes a dictionary 138 allowing conversion between:
  the English terms of the model and the corresponding output string template populated therefrom; and
  a target UI language.
The result of this activity is a translated, populated string template 139.

Frequently, the translator is up to the task of seamlessly converting the English language string template as populated with string variables, into another language.

On occasion, however, the translator may encounter a string that is resistant to translation. This difficulty may arise from any number of different possible reasons, including but not limited to: differences in gender forms, cases, and plural forms.

Moreover, even within a same language, complex grammatical rules may render difficult the accurate expression of certain string variables within a selected string template.

Accordingly, embodiments interpose an engine 150 between the server side application, and the user interface. It is the role of the engine to first detect strings that may be resistant to translation into a target language.

Then, if such translation-resistant strings are detected, the engine performs further processing in order to resolve the issue and produce an output comprehensible to the user in the target language. This additional processing can include but is not limited to, performing machine translation and/or falling back to simpler string variants.

In particular, at 152, the engine determines whether a string should be marked as resistant to translation. Such marking may be prompted by one or more factors that may include but are not limited to:
  the presence of an already-existing mark 153 that has been added by the translator (e.g., a placeholder value populated for a string variable);
  a number of string variables in the string template;
  the presence and/or number of developer comments in the string template;
  user settings;
  syntax rules;
  concatenation; and
  others.

As indicated in the above list, a string may have already been marked (e.g., by a placeholder value) by the translator itself as being resistant to translation. For example, the developer could manually instruct the translator to specifically designate particular terms as being difficult to translate.

Alternatively, or in conjunction with such developer marking, the translator could automatically mark a string template based upon certain criteria—e.g., as a string template that contains over a threshold number of string variables. On these grounds, a string template is therefore deemed likely to be difficult to translate.

Even when a particular translated and populated string template is not already marked by the translator, at 152 the engine is configured to determine whether that string should in fact be marked. This can be based upon one or more of the above factors, and is discussed further below in connection with the example.

In the next phase, at 154 the engine determines whether a string has been marked as being resistant to translation. For the majority of translated string templates, this will not be the case. Then the engine will in turn simply forward to the UI, the populated string template as translated into the target language.

If, however, the engine determines that a string has in fact been marked as difficult to translate (a relatively infrequent event), then additional processing takes place. Specifically, at 156 the engine adds to the string, a Machine Translation Prefix (MTP) and a Machine Translation Suffix (MTS) that bracket the string deemed resistant to translation. In some embodiments, the MTP and MTS may be added using invisible text (e.g., Unicode characters) that will not ultimately be displayed.

Then, at 158 additional processing of the string including the MTP and MTS is performed. Such processing can involve the resort to machine translation (MT) 160 of the string, or an entire string template in which the string is present, or a variant of the string or the string template.

In some embodiments, the processing can involve falling back to simpler string variants.

Accordingly, FIG. 1 shows the engine producing modified output 170, and forwarding same to the client side application. In particular embodiments, the modified output can include machine translated content 172. In certain embodiments, the modified output can include a simpler string variant 174.

Under some circumstances, the modified output may include the MTP and MTS. The MTP and MTS may be invisible, and hence not need to be removed prior to the modified output being communicated to a user.

Alternatively however, either the engine or the client-side application may be configured to recognize the MTP and MTS, and remove same prior to communicating the output to the user.

Figure 2:
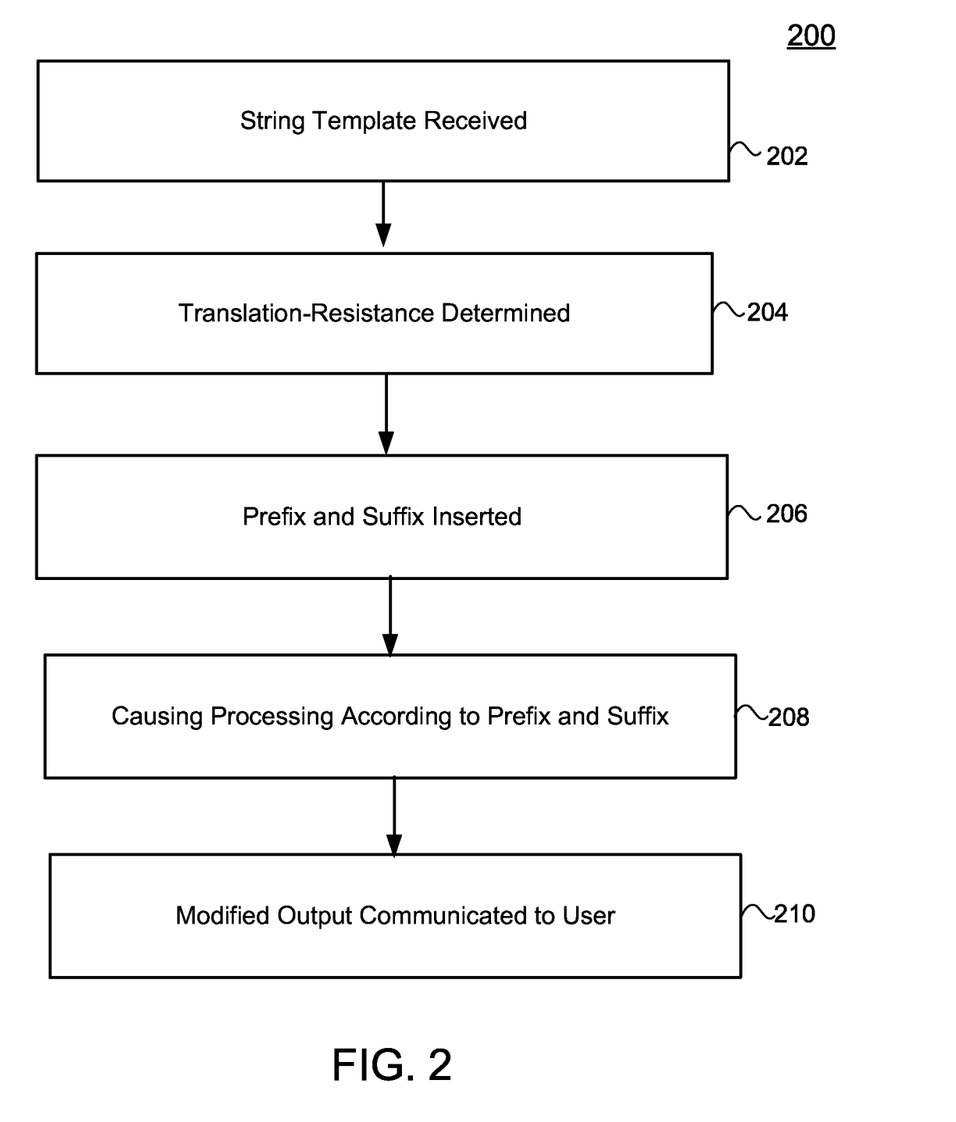
FIG. 2 shows a simplified flow diagram of a method according to an embodiment.

FIG. 2 is a flow diagram showing various actions taken in a method 200 according to an embodiment. At 202, a string template is received.

At 204, resistance to translation of the string template is determined. At 206, a prefix and a suffix are inserted.

At 208, processing of the string template according to the prefix and suffix is performed. At 210, modified output is communicated to the user.

Embodiments may offer certain benefits over various other approaches. For example, some approaches may involve the automatic forwarding of all strings for machine translation. There, page display can be delayed because it takes some time to generate all translations. Also, such machine translation may not be in synchronization with the last published source language resources.

Embodiments also offer enhanced flexibility. That is, more and more often a particular application may belong to a larger suite of interoperable applications. One example is an Enterprise Resource Management (ERM) application that is configured to be interoperable with a related suite of applications including a Customer Relationship Management (CRM).

Such 'intelligent enterprise' paradigms may call for the translation of many of the same terms commonly used in the suite. And, terms that are translation-resistant in the context of one application, may also likely be considered translation-resistant in the other applications of the suite.

Moreover, various applications that are part of an interoperable suite may rely upon common microservices (e.g., for currency conversion across ERP and CRM). Those microservices may reference many of the same translation-resistant strings, and accordingly benefit from the presence and operation of single engine according to embodiments as are described herein.

Thus, according to embodiments the engine as described herein could reside between these multiple applications and a UI. The engine may communicate with the multiple applications to create user interfaces that are dynamically assembled from text snippets, thereby conserving processing resources.

Further details are now provided in connection with a particular example involving specific elements of the SAP Analytics Cloud (SAC) analytical application that is available from SAP SE, of Walldorf, Germany.

Example

Here, the SAC application may reference a stored model titled: "Profit&Loss" that describes the (complex) financial state of a (large) commercial entity. A user may seek to interact with SAC through a Spanish language UI.

The model Profit&Loss includes the variables "Deal Value" and "Key Influencers". One set of Key Influencers are dimensions or measures within the Profit&Loss model that statistically impact the outcome of the Deal Value variable, more than other columns.

In this particular example SAC may identify within the Profit&Loss model, the following eight (8) Key Influencers of the variable Deal Value:
(1) Length of Sales Cycle
(2) No. Licenses
(3) Customer Status
(4) No. Customer Meetings
(5) Deals_Above_100K
(6) Contact Level
(7) No. Contact
(8) Product
That is, after analyzing Profit&Loss for potential statistical patterns, the predictive model indicates high confidence in these particular Key Influencers.

A SAC user may seek to further explore the relationships between the variables 'Deal Value' and 'Key Influencers'. One possible query for the SAC UI may be:

How does #1 Length of Sales Cycle Influence Deal Value?

This in turn may prompt the analytics application to provide a first suggested follow-on query:

What is the transaction distribution for length sales cycle across deal value?

The analytics application may employ string templating for the variables 'Deal Value' and 'Key Influencers'. The following offers an example response to that query returned in the form of a sentence according to a string template structure.

The Deal Value of 1 Year transactions averages at 149.33K, with the majority of transactions between 80K to 120K.

In particular, this sentence is structured according to the following specific string template:

The {0} of {1} average at {2}, with the majority of {3} between {4} to {5}

For this particular string template, {_} indicate specific string variables to be populated as listed below.
{0}: Deal Value
{1}: 1 Year transactions
{2}: 149.33K
{3}: transactions
{4}:80K
{5}: 120K The above string template could also be used to generate other sentences, such as:

The width of Japanese cars average at 1.84 meters, with the majority of current widths between 1.80 meters to 1.85 meters.
-or-
The daily nutrition intake of Danish schoolchildren average at 2238 calories, with the majority of single meals between 700 to 800 calories/day.

However, this string template may not be readily translatable into other (non-English) human languages such as Spanish (e.g., where nouns have genders), and/or languages having more than one plural form. Under such circumstances, accurate determination of the correct forms may involve some knowledge of the actual values of the string variables.

But, the actual values of such string variables may only become available at runtime. Moreover, integers and floating-point numbers also may call for different grammar in the target language (e.g., English).

Finally, due to grammatical rules of particular languages, whatever a translator writes may not be grammatically correct in the target language. This is potentially true even for English itself.

In order to address issues arising from translation of such text in a dynamic web application environment, embodiments employ a technique applying machine translation to specific UI strings when showing a web page to the user. Particular embodiments make an initial determination between strings that are translatable, and those that resist translation.

For strings deemed to be translatable, a server-based translation is performed. For strings deemed resistant to translation, a machine language translation may be performed by a proxy that is present between the web server and the user.

Under the server-based translation approach, the strings in a software UI may be:
externalized,
translated in resource files (Java properties, .NET resx, Android XML, iOS strings . . . ),
uploaded to a web server, and
displayed to the user navigating to a URL.

Under the proxy-based translation approach, the application server can return source language strings. A translation proxy intercepts the server's http responses and translates the strings in the UI on demand.

Figure 3:
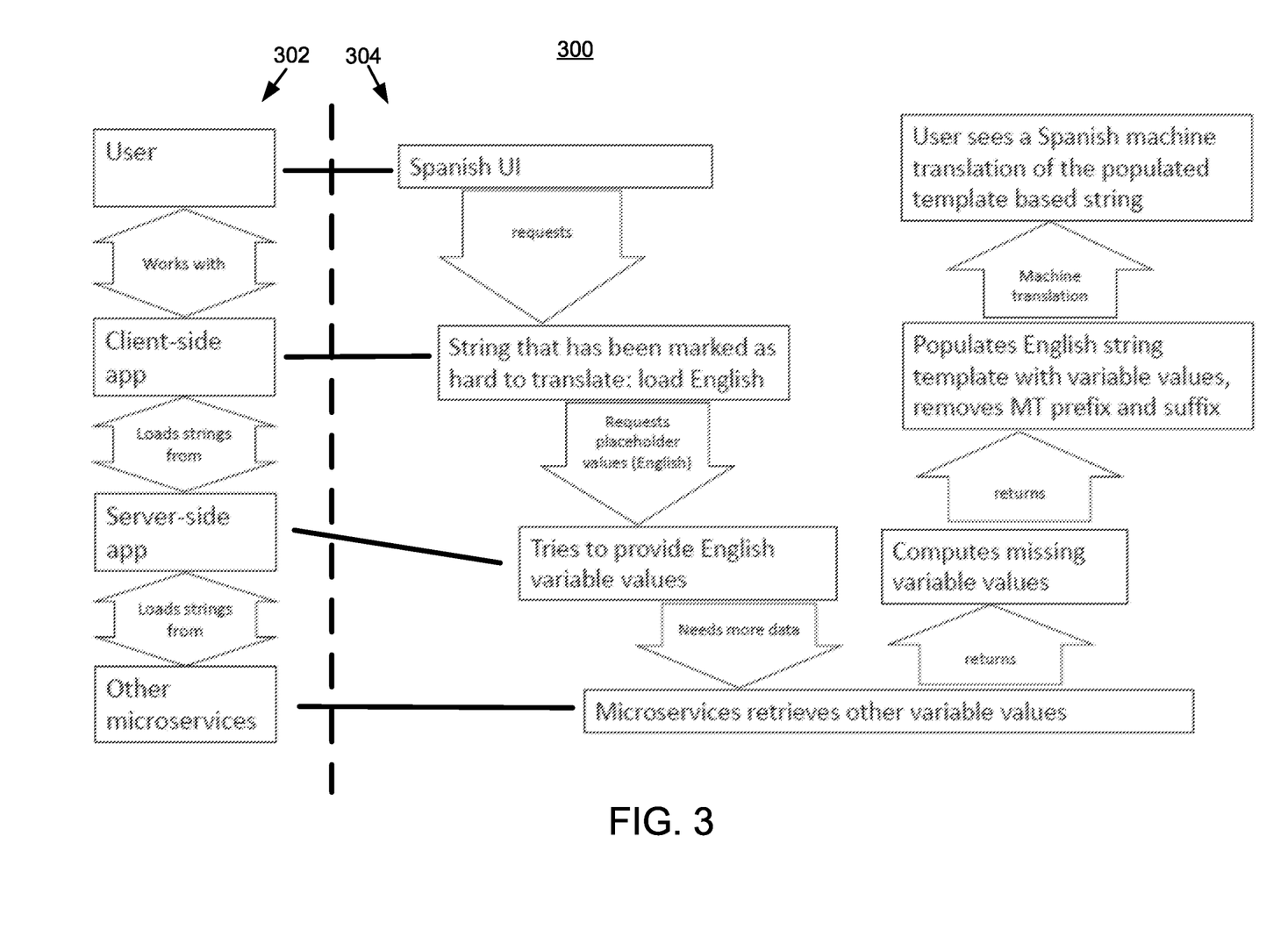
FIG. 3 shows a simplified view of an exemplary embodiment.

FIG. 3 shows a simplified overview 300 of the operation of an exemplary embodiment. In particular, FIG. 3 shows the web application runtime 302, and the corresponding handling 304 of a string template.

The identification of strings that are present within source files and which are resistant to translation, is now discussed.

One possibility is to allow the (human) translator to decide. In this scenario, the translation environment offers the translator a choice of marking a specific string that is perceived to be resistant to translation.

The translated file may include the strings in the source language, with a prefix added to indicate that this string still needs to be translated. This sequence could, for example, utilize invisible characters not affecting readability of the original strings in the UI. Thus the use of invisible Unicode characters (e.g., U+200B, U+200E, U+200F, U+200B, U+200F) should render it unlikely that this sequence appears in a real text.

A variety of different sequences may be used. But, whatever their form, the sequences are referred to herein as the Machine Translation Prefix (MTP). As described above, a Machine Translation Suffix (MTS) may be added that is different from the MTP.

An alternative to relying upon a human to specifically mark translation-resistant strings, is to apply syntax rules. Specifically, the number of variables that are present in a string may function as an indicator for its amenability to translation.

That is, the more variables present in a string, the more difficult it may be to translate that string. The following offers a list some real-life examples of strings having at least two variables (these are indicated with italics).

{0}, {1} at {2} has recommended you
{0} within {1} of {2}
within {0} {1} of {2}
% s•to•% s
% B•% d,•% s
Uploading•% 1$ld•of•% 2$ld•files . . . .
% 1$@•by•% 2$@
% 1$@,•from•% 2$
The•Notification's•Recipient•will•receive•reminders•
 {0}•{1}•(which•is•equal•{2})•<br/> every•{3}•day
Step•{0}•of•{1}
Code•{0}•Description•[{1}]
Advanced•conditions•of•{0}•/•{1} Form.
% (jobboard_name)s•/•Feed•activation•-
 •Client•{company_name}
Alert:•% (count)s•CVs•found•for•\"% (search_title)s\"
% (min)s to % (max)s months from % (month)s
% (max)s % (text)s from % (month)s The syntax of variables may depend upon the particular programming language that is being used. Translation tools may be equipped with built-in scanners for more common formats.

In addition, translation tools may allow customizing patterns for finding variables. Therefore, detection and counting of variables is possible.

The amenability of string variables to translation, may also depend upon whether comments are present. Thus a separate potential factor for determining translatability, is the presence of comments.

If there is no developer comment present, it may make sense to assume that strings with three variables or two adjacent variables are difficult to translate and should be machine translated.

By contrast, if a developer comment is present, it may or may not explain what the variables stand for. Under these circumstances, a user setting may specify how the string would be treated.

Strings deemed resistant to translation according to specified rules, can be prefixed with the MTP, and/or suffixed with the MTS.

When running HTTP responses, the machine translation proxy distinguishes strings yet to be machine translated, from strings already translated. This reduces the workload and improves efficiency. Details regarding this distinguishing capability are now discussed.

At least two possible approaches may distinguish strings, depending upon the manner of the upstream detection of strings deemed to be resistant to translation.

In a first approach, the proxy can explicitly search for strings that contain a specific flag (e.g., MTP).

Alternatively, the proxy can apply rules used in the preceding step involving the application of syntax rules to determine translatability. This second option could maintain rules in synchronization between the translation environment and the proxy server.

The appearance of a MTP within a UI string, may indicate concatenation of a string that was difficult to translate. Under such circumstances, it may make sense to route the entire UI string for machine translation.

This may also hold true where a MTS occurs in the middle of a string. In both instances, the MTP and MTS may be removed prior to routing the string to the machine translation provider.

The following is an example of a concatenated UI string using [MTP] as MTP and [MTS] as MTS:

You have applied for vacation from [MTP] % s•to•% s[MTS].

In this example, the text:
'You have applied for vacation from'
may originate from a different code module than the string:
'% s to % s' with MTP and MTS.

Nevertheless, the additional context makes it likely that a machine translation will yield a useful result.

Deploying MTP/MTS may require the components contributing to the UI, to use the same MTP/MTS. This can include customer-specific UI adaptations.

A potential benefit of MTP/MTS approaches, may be significant reduction in wait time for a translation. That is, when using a proxy server reliant on MTP for detecting strings for machine translation, at design time developers can generate strings with an MTP and MTS for the target languages. These strings may then be overwritten with translations.

Implementation of embodiments as described herein may be considered judiciously, as in certain cases a quality of machine translation may not be good enough for some UI strings. However, by temporarily employing machine translations, embodiments approach may result in considerable reduction in lag times.

Returning to FIG. 1, there the particular embodiment is depicted with the engine as being located outside of the database storing a string template. However, this is not required.

Instead, alternative embodiments could leverage the processing power of an in-memory database engine (e.g., the in-memory database engine of the HANA in-memory database available from SAP SE), in order to perform various functions. Such functions can include but are not limited to determining the translation-resistance of a string template.

Figure 4:
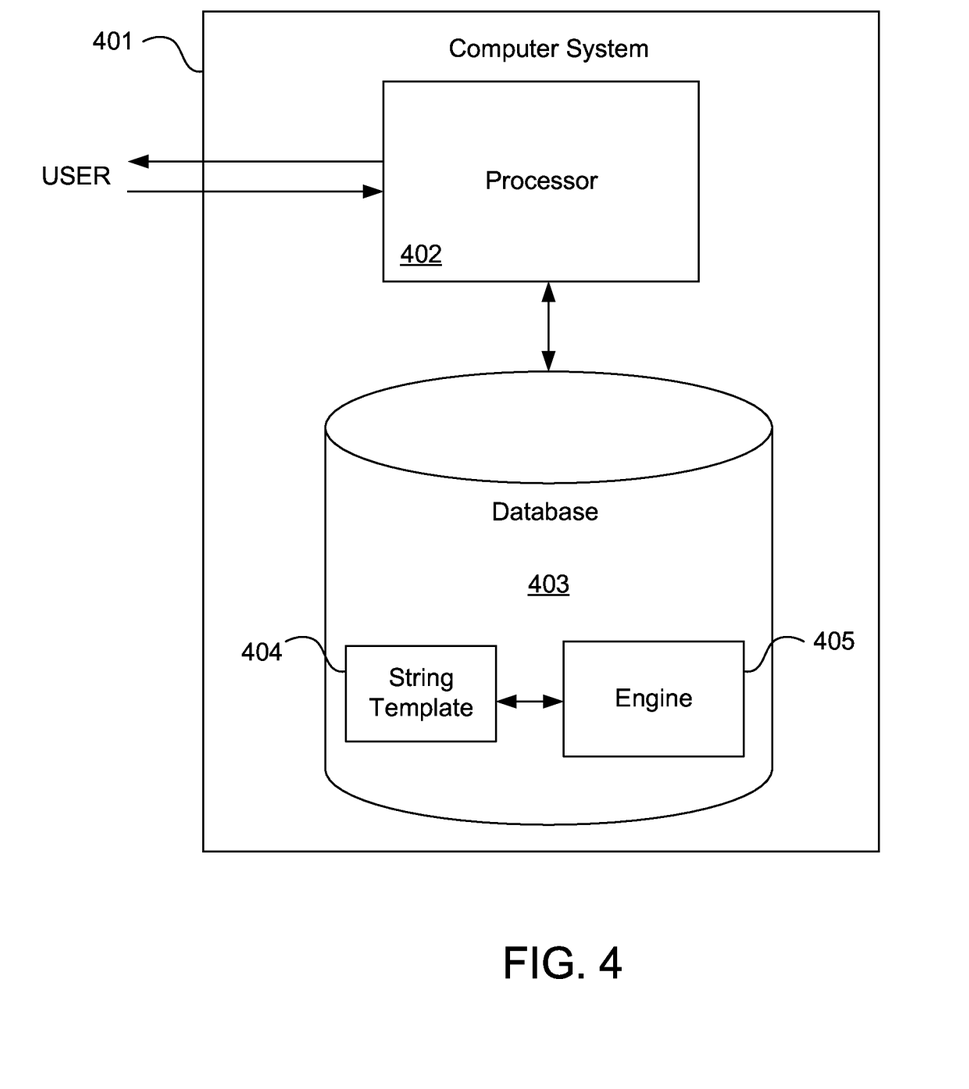
FIG. 4 illustrates hardware of a special purpose computing machine configured to perform string processing according to an embodiment.

FIG. 4 illustrates hardware of a special purpose computing machine configured to perform text translation according to an embodiment. While FIG. 4 illustrates a computing machine located on the server side, alternative embodiments could be located on the client side (e.g., in a local network).

In FIG. 4, computer system 401 comprises a processor 402 that is in electronic communication with a non-transitory computer-readable storage medium comprising a database 403. This computer-readable storage medium has stored thereon code 405 corresponding to an engine. Code 404 corresponds to a string template. Code may be configured to reference data stored in a database of a non-transitory computer-readable storage medium, for example as may be present locally or in a remote database server. Software servers together may form a cluster or logical network of computer systems programmed with software programs that communicate with each other and work together in order to process requests.

Figure 5:
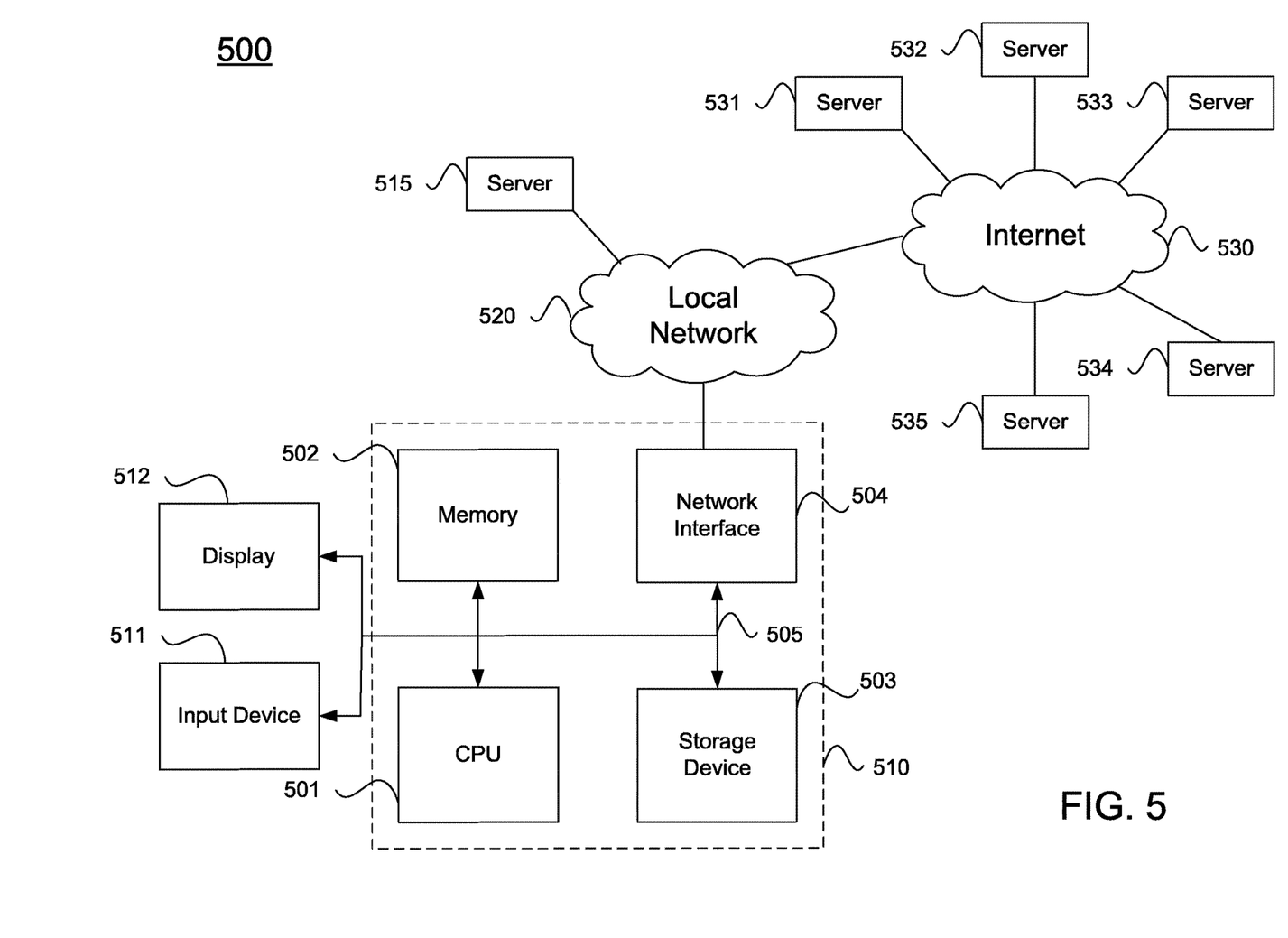
FIG. 5 illustrates an example computer system.

An example computer system 500 is illustrated in FIG. 5. Computer system 510 includes a bus 505 or other communication mechanism for communicating information, and a processor 501 coupled with bus 505 for processing information. Computer system 510 also includes a memory 502 coupled to bus 505 for storing information and instructions to be executed by processor 501, including information and instructions for performing the techniques described above, for example. This memory may also be used for storing variables or other intermediate information during execution of instructions to be executed by processor 501. Possible implementations of this memory may be, but are not limited to, random access memory (RAM), read only memory (ROM), or both. A storage device 503 is also provided for storing information and instructions. Common forms of storage devices include, for example, a hard drive, a magnetic disk, an optical disk, a CD-ROM, a DVD, a flash memory, a USB memory card, or any other medium from which a computer can read. Storage device 403 may include source code, binary code, or software files for performing the techniques above, for example. Storage device and memory are both examples of computer readable mediums.

Computer system 510 may be coupled via bus 505 to a display 512, such as a cathode ray tube (CRT) or liquid crystal display (LCD), for displaying information to a computer user. An input device 511 such as a keyboard and/or mouse is coupled to bus 505 for communicating information and command selections from the user to processor 501. The combination of these components allows the user to communicate with the system. In some systems, bus 505 may be divided into multiple specialized buses.

Computer system 510 also includes a network interface 504 coupled with bus 505. Network interface 504 may provide two-way data communication between computer system 510 and the local network 520. The network interface 504 may be a digital subscriber line (DSL) or a modem to provide data communication connection over a telephone line, for example. Another example of the network interface is a local area network (LAN) card to provide a data communication connection to a compatible LAN. Wireless links are another example. In any such implementation, network interface 504 sends and receives electrical, electromagnetic, or optical signals that carry digital data streams representing various types of information.

Computer system 510 can send and receive information, including messages or other interface actions, through the network interface 504 across a local network 520, an Intranet, or the Internet 530. For a local network, computer system 510 may communicate with a plurality of other computer machines, such as server 515. Accordingly, computer system 510 and server computer systems represented by server 515 may form a cloud computing network, which may be programmed with processes described herein. In the Internet example, software components or services may reside on multiple different computer systems 510 or servers 531-535 across the network. The processes described above may be implemented on one or more servers, for example. A server 531 may transmit actions or messages from one component, through Internet 530, local network 520, and network interface 504 to a component on computer system 510. The software components and processes described above may be implemented on any computer system and send and/or receive information across a network, for example.

The above description illustrates various embodiments of the present invention along with examples of how aspects of the present invention may be implemented. The above examples and embodiments should not be deemed to be the only embodiments, and are presented to illustrate the flexibility and advantages of the present invention as defined by the following claims. Based on the above disclosure and the following claims, other arrangements, embodiments, implementations and equivalents will be evident to those skilled in the art and may be employed without departing from the spirit and scope of the invention as defined by the claims.

What is claimed is:

1. A computer-implemented method comprising:
   receiving a string template populated with a string variable and translated into a language;
   determining that the string template is resistant to translation;
   inserting a prefix and a suffix into the string template;
   causing the string template to be processed according to the prefix and the suffix to generate a modified output; and
   communicating the modified output to a user,
   wherein:
   the string template comprises a comment; and
   the determining is based upon the comment.

2. A method as in claim 1 wherein:
   the string template is received from a translator; and
   the determining comprises detecting a mark inserted by the translator to indicate the string template is resistant to translation.

3. A method as in claim 2 wherein:
   the string template comprises a plurality of string variables; and
   the mark is based upon a number of the plurality of string variables.

4. A method as in claim 1 wherein causing the string template to be processed comprises forwarding the string template for machine translation.

5. A method as in claim 1 wherein causing the string template to be processed comprises falling back to a simpler string variant.

6. A method as in claim 1 wherein the string template is populated from a microservice.

7. A method as in claim 1 wherein the prefix and the suffix comprise invisible characters.

8. A method as in claim 1 further comprising removing the prefix and the suffix prior to communicating the string template to the user.

9. A non-transitory computer readable storage medium embodying a computer program for performing a method, said method comprising:
   receiving a string template populated with a string variable and translated into a language;
   determining that the string template is resistant to translation;
   inserting a prefix and a suffix into the string template;
   causing the string template to be forwarded for machine translation according to the prefix and the suffix to generate a modified output; and
   communicating the modified output to a user,
   wherein:
   the string template comprises a comment; and
   the determining is based upon the comment.

10. A non-transitory computer readable storage medium as in claim 9 wherein:
the string template comprises a plurality of string variables; and
the determining is based upon a number of the plurality of string variables.

11. A non-transitory computer readable storage medium as in claim 9 wherein:
the string template is received from a translator; and
the determining is based upon detection of a mark inserted by the translator.

12. A non-transitory computer readable storage medium as in claim 9 wherein the prefix and the suffix comprise invisible characters.

13. A computer system comprising:
one or more processors;
a software program, executable on said computer system, the software program configured to cause an in-memory database engine of an in-memory database to:
receive from the in-memory database a string template populated with a string variable and translated into a language;
determine that the string template is resistant to translation;
insert a prefix and a suffix into the string template;
cause the string template to be processed according to the prefix and the suffix to generate a modified output; and
communicate the modified output to a user,
wherein the in-memory database engine is configured to determine that the string template is resistant to translation based upon a comment present in the string template.

14. A computer system as in claim 13 wherein the in-memory database engine is configured to determine that the string template is resistant to translation based upon a number of a plurality of string variables of the string template.

15. A computer system as in claim 13 wherein the in-memory database engine is configured to determine that the string template is resistant to translation based upon an existing mark inserted by a translator.

16. A computer system as in claim 13 wherein the causing the processing comprises forwarding the string template for machine translation.

17. A computer system as in claim 13 wherein the causing the processing comprises falling back to a simpler string variant.

* * * * *